UNITED STATES PATENT OFFICE.

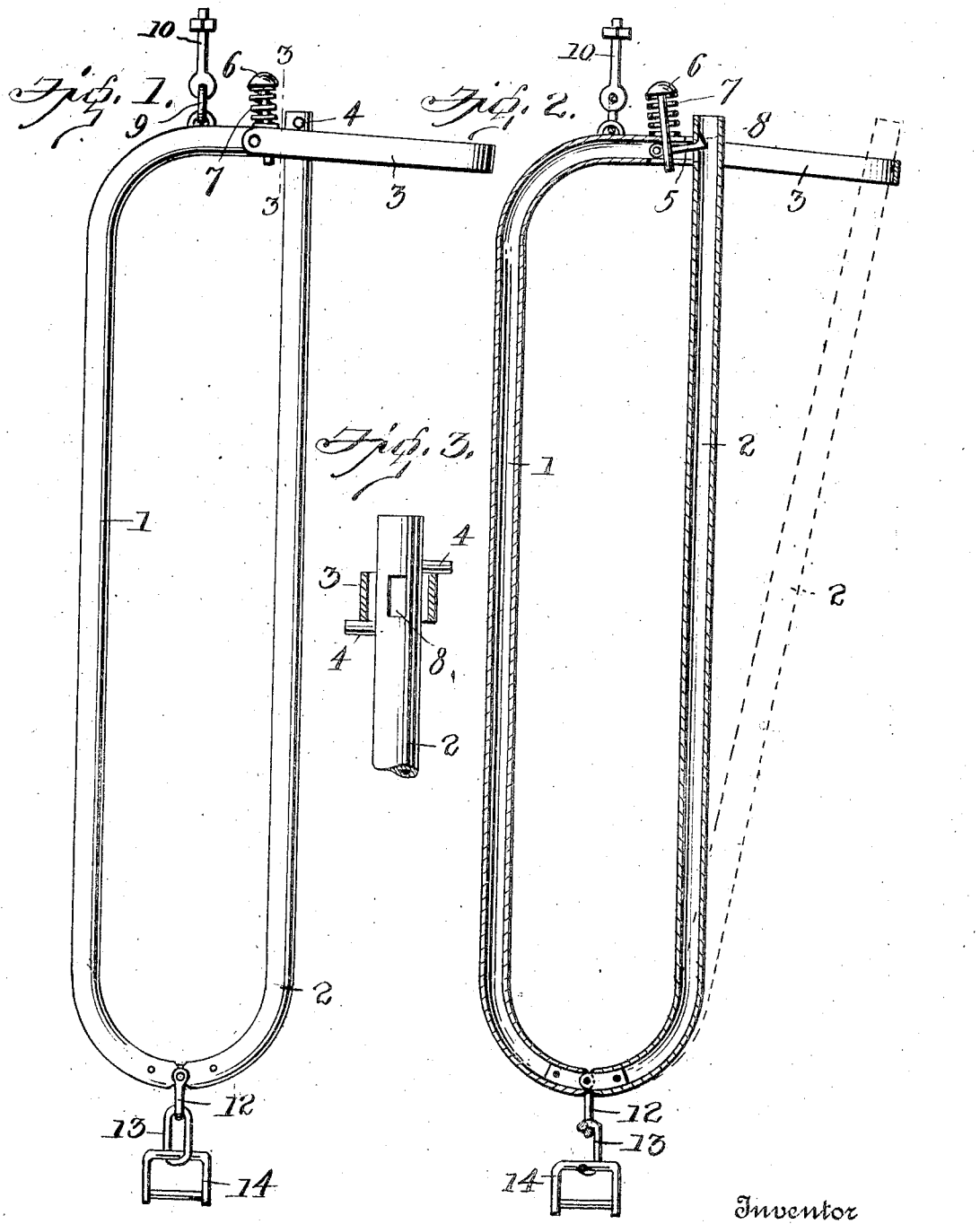

RICHARD BREHM, OF SHEBOYGAN, WISCONSIN.

CATTLE-STANCHION.

No. 821,153.　　　　Specification of Letters Patent.　　　　Patented May 22, 1906.

Application filed January 8, 1906. Serial No. 295,137.

*To all whom it may concern:*

Be it known that I, RICHARD BREHM, a citizen of the United States, residing at Sheboygan, in the county of Sheboygan and State of Wisconsin, have invented certain new and useful Improvements in Cattle-Stanchions; and I do declare the following to be a full, clear, and exact description of the invention, such as will enable others skilled in the art to which it appertains to make and use the same.

This invention relates to improvements in cattle-stanchions.

The object of the invention is to provide a cattle-stanchion or tying device which may be connected to any suitable support and which may be quickly and easily opened or closed to permit the attachment of the same to the head of the cow or other animal to be tied.

With the above and other objects in view the invention consists of certain novel features of construction, combination, and arrangement of parts, as will be hereinafter described and claimed.

In the accompanying drawings, Figure 1 is a side view of a stanchion constructed in accordance with the invention. Fig. 2 is a vertical sectional view of the same, showing in full lines the position of the parts when in closed or operative position and in dotted lines the inoperative position of the same; and Fig. 3 is a vertical sectional view through the upper end of the stanchion, taken on the line 3 3 of Fig. 1.

Referring more particularly to the drawings, 1 denotes the main side bar of the stanchion, said bar being curved laterally at its upper and lower ends, as shown. To the lower curved end of the bar 1 is pivotally connected the lower curved end of a movable bar 2. Pivotally connected to the upper curved end of the main bar 1 is a guide-loop 3, which is adapted to engage the upper end of the movable bar 2, as shown. The upper end of the movable bar is provided on opposite sides with laterally-projecting guide-studs 4, one of which is arranged above and the other below said guide-loop 3, thus slidably connecting the upper end of said movable bar with said loop.

In the outer end of the upper curved portion of the main bar 1 is arranged a catch 5, said catch being preferably pivoted in the upper end of the bar 1 upon the pivot-bolt of the guide-loop 3. Connected to the upper side of the catch 5 and projecting upwardly through a slot in the top of the curved upper end of the main bar is a finger-piece 6. Around this finger-piece 6 and between the head of the same and the top of the bar 1 is arranged a coil-spring 7, the tension of which is exerted to hold the catch 5 in an operative position to engage an aperture or recess 8, forming a keeper in the adjacent side of the upper end of the movable bar 2, whereby when said bar is swung into engagement with said catch the same will automatically engage said keeper-aperture, thereby locking said movable bar in closed position.

To the upper end of the main bar 1 is loosely connected a link 9, which is adapted to be engaged with an eyebolt 10 to attach the same to a suitable support. At the lower end of the stanchion is pivotally connected a clevis 12, to which is connected a link 13, said link being secured to an elongated staple 14 or other suitable fastening, whereby a sliding or loose connection is provided for the lower end of the stanchion.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claims.

Having thus described my invention, what I claim as new, and desire to secure by Letters Patent, is—

1. A cattle-stanchion comprising a main upright side bar having laterally-curved upper and lower ends, a movable side bar hingedly connected at its lower end to the laterally-curved lower end of said main bar, a pivoted guide to receive the upper end of said hinged bar, and a spring-projected catch to engage the upper end of the latter, thereby locking the same in closed position, substantially as described.

2. A cattle-stanchion comprising a main upright side bar having laterally-curved upper and lower ends, a movable side bar having a keeper at its upper end and a laterally-curved lower end hingedly connected to the curved lower end of said main side bar, a bail-shaped guide-loop pivotally connected to the upper curved end of said main side bar, and a spring-actuated catch arranged in said curved upper end of the main bar and adapted to engage the keeper in the upper end of said hinged bar, substantially as described.

3. A cattle-stanchion comprising a main upright side bar having laterally-curved upper and lower ends, a movable side bar having an aperture in its upper end forming a keeper and a laterally-curved lower end hingedly connected to the curved lower end of said main side bar, a bail-shaped guide-loop pivotally connected to the upper curved end of said main side bar, a spring-actuated catch arranged in said upper curved end of the main bar to engage the aperture forming a keeper in the upper end of said hinged bar, guide-lugs arranged on the upper end of said hinged bar above and below said guide-loop, and means arranged at the upper and lower ends of said stanchion to loosely connect the same with suitable supports, substantially as described.

In testimony whereof I have hereunto set my hand in presence of two subscribing witnesses.

RICHARD BREHM.

Witnesses:
A. GILBERTSON,
F. C. WEISKOPF.